United States Patent Office 2,954,258
Patented Sept. 27, 1960

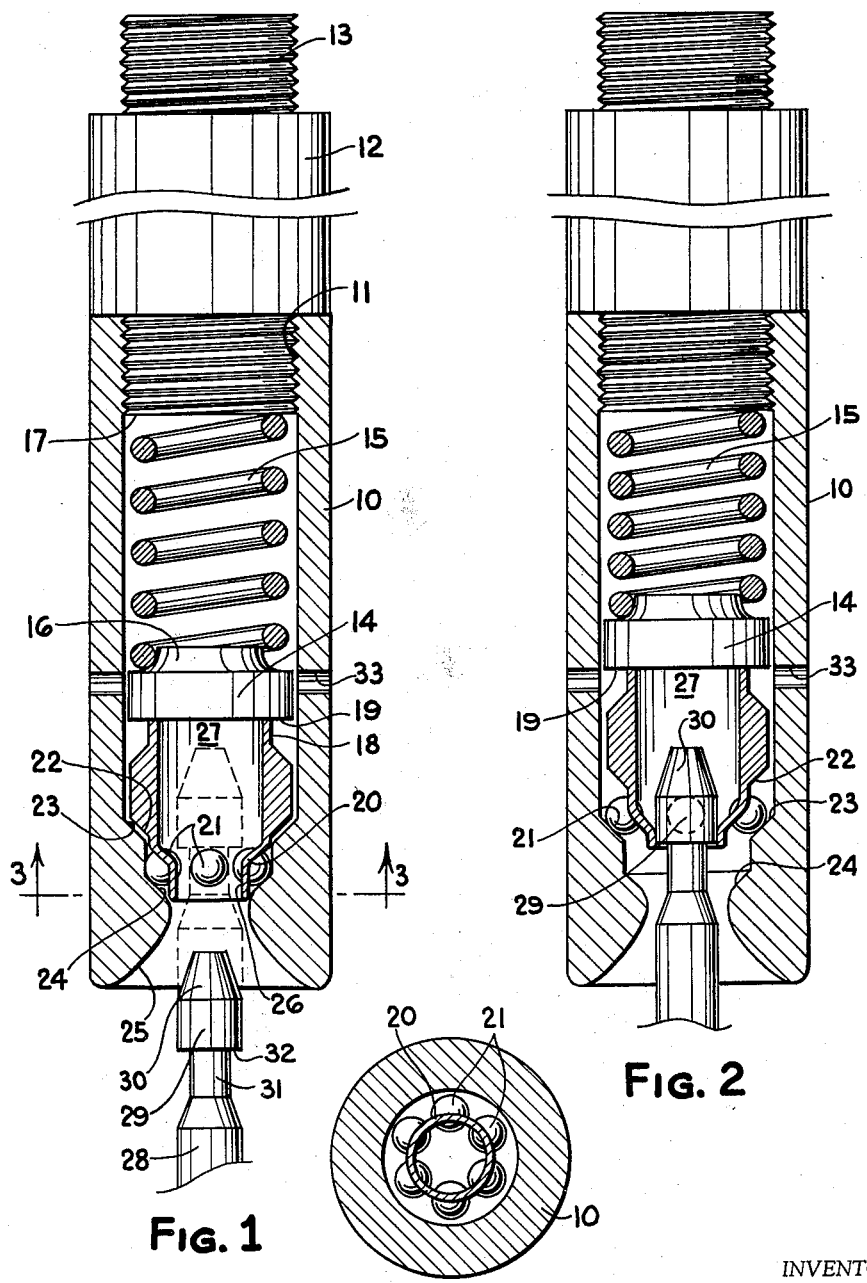

2,954,258

RETRIEVING TOOL

De Orr Cook, 88 Eugenia Drive, Ventura, Calif.

Filed June 16, 1958, Ser. No. 742,266

3 Claims. (Cl. 294—102)

This invention relates generally to retrieving tools and more particularly to improved fishing tools for recovering objects from oil well bore holes.

Many present day fishing tools may be employed to retrieve well logging instruments and the like from the bottom of bore holes, and to this end are designaed to engage a spear member affixed to the upper end of the instrument to be recovered. This fishing tool itself usually includes retractable springs or hooks adapted to engage about the spearhead of the instrument when lowered into engagement therewith near the bottom of the bore hole.

In some of these fishing tools, the engaging spring fingers or hooks are exposed and thus subject to clogging with mud or bending as a result of buffeting and rubbing action against the sidewalls of the bore hole during the lowering and raising operation. In addition, to make effective engagement with the spearhead on the instrument, usually the full weight of the tool is caused to drop on this spear in order to insure proper engagement thereof. As a consequence, the spearhead itself may be damaged or bent. In other instances, the coupling to the spearhead is such that the retrieved instrument cannot readily tilt or rotate while being raised and thus in crooked bore holes the spearhead may also be distorted or otherwise damaged.

In certain operations the weight of the instrument itself may damage the fishing tool coupling mechanism since this full weight is generally borne by the retractable springs or hooks employed in engaging the spearhead.

Bearing the foregoing in mind, it is a primary object of the present invention to provide a greatly improved fishing or retrieving tool in which many of the foregoing difficulties are overcome.

More particularly, it is an object to provide a retrieving tool in which all of the moving parts thereof are completely shielded and enclosed within a cylindrical casing or barrel with the exception of a bottom ingress opening for receiving the spearhead associated with the instrument to be raised. Thus, any damage or clogging of the movable parts during lowering and raising in the bore hole is minimized.

Another important object is to provide an instrument in which initial engagement with the spearhead is effectively cushioned to minimize damage thereto and also one in which the coupling arrangement is such that the spearhead and instrument being raised is free to tilt or rotate during ascent so that any damage to the spearhead or coupling mechanism as a consequence of raising or lowering in crooked bore holes is minimized.

Still another object is to provide a retrieving tool in which the weight of the instrument or other object being raised is borne by the principal body portions of the tool itself rather than the coupling means alone so that loads can be raised without risk of damaging the coupling portions of the tool.

Other objects of the invention are to provide an improved retrieving tool meeting the foregoing objects which is extremely rugged, economical to manufacture as compared to fishing tools for performing similar functions, employs a minimum number of moving parts, and is generally more reliable and positive in operation than tools heretofore used in the prior art for similar purposes.

Briefly, these and many other objects and advantages of this invention are attained by providing a barrel member having an upper plug portion adapted for connection to any suitable apparatus for lowering and raising the barrel within an oil well bore hole. The lower interior end of the barrel includes tapered shoulder portions defining a lower opening. Within the barrel there is provided a sleeve member incorporating a cage mechanism at its lower end for supporting and limiting radially inwardly movement of a plurality of balls. This cage structure is disposed normally at the same level as one of the inwardly tapered shoulders at the interior of the barrel so that raising of the sleeve member above this tapered portion will free the various balls for radial outward movement and thus increase the ingress opening into the interior of the sleeve. A single compression spring is disposed in the barrel between the top portion of the sleeve member and the plug.

By the above described arrangement, all of the moving parts are completely enclosed by the barrel member itself and the only opening to the exterior is through the bottom end of the barrel which is arranged to receive the spearhead connected to an instrument to be retrieved. In the operation of the device, the spearhead is initially engaged by the balls and the compression spring cushions this initial engagement. Further lowering of the retrieving tool will result in an upward movement of the sleeve until the plurality of balls are free to move radially outwardly and thus admit the spearhead into the sleeve. Once the spearhead is received within the sleeve, the compression spring will then force the sleeve downwardly since the balls can then move radially inwardly under the head of the spear. By the use of the balls, the spearhead is free to tilt to some extent and also rotate within the sleeve during the raising operation.

A bettter understanding of the invention will be had by referring to a preferred embodiment thereof as illustrated in the accompanying drawings in which:

Figure 1 is an enlarged elevational view partly in cross section illustrating the retrieving tool with the retrieving sleeve member in a lowermost first position preparatory to receiving the spearhead of an instrument to be retrieved;

Figure 2 is a view similar to Figure 1 illustrating the position of corresponding parts upon initial entrance of the spearhead within the retrieving tool; and, Figure 3 is a cross sectional view taken in the direction of the arrows 3—3 of Figure 1.

Referring first to Figure 1, the retrieving tool comprises a barrel member 10 having a threaded upper portion 11 for receiving a plug 12. The upper portion of the plug terminates in a threaded portion 13 for threaded connection to any conventional lowering or raising apparatus available at oil well bore holes.

Within the hollow cylindrical interior of the barrel 10, there is provided a movable member in the form of a sleeve 14. This sleeve is slidable within the barrel and normally biased to its lowermost position or the position shown in Figure 1 by a compression spring 15 disposed about a boss 16 at the top of the sleeve member 14 at its lower end and bearing upwardly against the bottom 17 of the plug at its upper end. The sleeve member as shown in the cross sectional portion thereof includes a reduced diameter exterior 18 defining an annular shoulder 19. The lower end of the sleeve includes as a part thereof a cage assembly 20 arranged to support and limit radial inward movement of a plurality of steel balls 21. Immediately above the cage assembly 20 the sleeve is formed with a flared portion 22 defining an annular shoulder. As shown, this annular shoulder 22 is adapted to rest against a first annular tapered shoulder 23 formed in the lower interior portion of the barrel 10 when the sleeve is in the lowermost position shown.

This first annular tapered shoulder 23 in the barrel terminates in a cylindrical portion of given diameter and then merges into a second tapered annular interior shoulder 24. The second shoulder 24 is disposed at the same level as the level of the balls 21 and serves together with the cage member 20 to confine the balls in the position shown. The extreme lower end of the barrel 10 then flares outwardly to define a receiving opening as indicated at 25. This outwardly flared portion 25 serves to guide a spearhead into the bottom opening 26 of the sleeve member 14 to the interior 27 of the sleeve member. The spear itself is indicated at 28 and includes a head portion 29 terminating in an upper conical surface 30. Below the head 29 there is a reduced diameter portion 31 defining an annular undercut shoulder 32.

In Figure 2 it will be evident that when the barrel 10 is lowered over the spearhead 29, the conical surface portion 30 thereof will bear against the balls 21 to cause the sleeve member to be moved upwardly since the plurality of balls are initially confined by the second annular shoulder 24. However, after the sleeve member is moved up above the second annular shoulder, the balls 21 are then free to move radially outwardly as indicated in Figure 2, thereby increasing the ingress to the sleeve and permitting the spearhead 29 to pass up into the interior 27 of the sleeve member.

In the cross sectional view of Figure 3, it will be noted that as many as six ball bearings 21 may be employed circumferentially spaced about the cage 20. The cage assembly 20 includes openings for receiving portions of each of the balls, the radius of these openings being less than the radius of the balls so that the balls are constrained against radial inward movement beyond a certain point. However, the balls are free for radially outward movement. Therefore, when the sleeve member 14 is urged upwardly to the position shown in Figure 2 wherein the level of the cage assembly and balls corresponds to that of the first tapered shoulder 23 of the barrel, the balls are free to move radially outwardly.

The operation of the device will be evident from the above description. Referring again to Figure 1, the barrel 10 is lowered into the bore hole by coupling the threaded end 13 of the plug 12 to the end of suitable lowering apparatus. The instrument to be retrieved is provided with a spear such as indicated at 28. The barrel 10 is lowered until the conical portion 30 of the spearhead 29 engages the outwardly flared surface 25 at the extreme lower end of the barrel. The tapering of the surface serves to guide the head 29 into the ingress opening 26 of the sleeve member wherein the head upon continued lowering of the barrel 10 will urge the sleeve member upwardly as described in connection with Figure 2.

After the spearhead 29 is wholly within the interior 27 of the sleeve member, the compression spring 15 urges the sleeve member downwardly since the balls 21 may move radially inwardly under the annular shoulder 32 of the spearhead 29. Thus, the sleeve will again assume the position illustrated in Figure 1 and the spearhead will then be in the dotted line position shown in Figure 1 in the interior 27.

The barrel 10 is then raised from the bore hole together with the spearhead and instrument as a consequence of engagement of the underside of the head 29 by the balls. It will be noted that in the position of the sleeve illustrated in Figure 1 the annular shoulder 22 of the lower end portion of the sleeve member above the cage assembly rests against the first annular shoulder 23 of the barrel and thus the major portion of the weight of the instrument is supported by this engagement. On the other hand, by the use of the balls 21 it will be evident that the spearhead is free to swivel, the shoulder portion 32 simply riding around on the steel balls during such swiveling action. Further, a certain amount of tilting can take place without fear of damaging the spearhead.

After the instrument or other item to be retrieved has been raised to the surface, it may readily by disengaged by physically forcing upwardly the sleeve member 14. This may be accomplished by simply pressing the barrel down over the spearhead until the end of the conical portion 30 engages the bottom of the upper interior 27 of the sleeve member. Further urging downwardly of the barrel 10 will compress the spring 15. When the sleeve has been raised within the barrel to the level shown in Figure 2, a small pin or other object may be inserted in a lateral opening 33 to lodge under the annular shoulder 19 and thus hold the sleeve in this upper position. The spearhead may then readily be retracted from the bottom of the sleeve inasmuch as there is ample space of the balls 21 to move outwardly when the sleeve is in the position shown.

From the foregoing description, it will be evident that the present invention has provided a greatly improved retrieving instrument. Aside from the plurality of balls for effecting the desired engagement of the spearhead, the entire tool comprises only four major portions: first, the barrel section 10; second, the plug 12; third, the compression spring 15; and fourth, the sleeve member 14. Each of these elements is rugged and will serve its respective purpose over a long period of time without failure. Moreover, because the barrel portion 10 completely surrounds all of the moving parts with the exception of the lower ingress opening for the spearhead, there are no movable parts exposed to possible rubbing or buffeting action as the tool is being raised or lowered in the bore hole.

Modifications that fall within the scope and spirit of the present invention will readily occur to those skilled in the art. The improved retrieving tool is, therefore, not to be thought of as limited to the particular embodiment set forth for illustrative purposes.

What is claimed is:

1. A retrieving tool for recovering objects from oil well bore holes comprising, in combination: a barrel having an upper plug portion for connection to apparatus for lowering said barrel into said bore hole, and a cylindrical interior portion of a first given internal diameter, said interior portion including adjacent its lower end an annular portion tapering radially inwardly in a downward direction to define a first shoulder, the lower end of said first shoulder extending downwardly for a given distance and having a second given internal diameter merging into an annular portion tapering radially inwardly in a downward direction to define a second shoulder, the lower end of said second shoulder then flaring outwardly in a downward direction at the extreme lower end of said barrel to define an ingress opening; a sleeve member slidable in said cylindrical interior portion; a cage assembly forming a part of the lower end of said sleeve member; a plurality of balls circumferentially disposed between said cage assembly and said second shoulder, portions of said balls projecting radially inwardly to partially close said ingress opening when said sleeve member is in its lowermost position in said barrel, said cage assembly limiting radial inward movement of said balls, said sleeve including an exterior annular outwardly flared portion above said cage assembly resting against said first shoulder when in said lowermost position; and a compression spring disposed between the top of said sleeve member and said plug biasing said sleeve to its lowermost position, whereby upward movement of said sleeve member and cage assembly above said second shoulder frees said balls for radial outward movement to open said ingress opening.

2. The subject matter of claim 1, in which said barrel includes a lateral opening in one side, said sleeve member having a reduced diameter portion adjacent its upper end defining an annular shoulder at a level corresponding to said lateral opening when said sleeve member is moved upwardly, so that insertion of a pin through said opening from the exterior of said barrel holds said sleeve member in its raised position.

3. A retrieving tool for recovering an object having an upwardly extending spear member from oil well bore holes comprising, in combination: a barrel having a hollow cylindrical interior of given inside diameter, the lower end thereof tapering inwardly in a downward direction to define an annular tapered shoulder terminating in a lower ingress opening of minimum diameter less than said given inside diameter; a sleeve member of outside diameter greater than said minimum diameter of said ingress opening and less than said given diameter within said interior, the lower end of said sleeve terminating in a reduced diameter cage assembly; a plurality of balls disposed circumferentially between said cage assembly and said annular tapered shoulder when said sleeve member is in its lowermost position, a portion of said balls projecting radially inwardly to partially close said ingress opening, said cage assembly limiting the inward radial extent of said balls; and a compression spring within the upper portion of said interior biasing said sleeve member to said lowermost position whereby upon lowering of said barrel and said ingress opening over said spear member, said spear member engages the radially inwardly projecting portions of said balls urging them upwardly to move said sleeve member upwardly, said balls being urged outwardly when said cage assembly assumes a position above said tapered shoulder so that said spear member is received entirely within said sleeve, said spring then urging said sleeve and cage assembly downwardly whereby said annular tapered shoulder urges said balls radially inwardly to engage under said spear member.

References Cited in the file of this patent

UNITED STATES PATENTS

| | | |
|---|---|---|
| 563,054 | Palm | June 30, 1896 |
| 737,101 | Henderson | Aug. 25, 1903 |
| 1,193,452 | Brewster | Aug. 1, 1916 |
| 1,195,463 | Hall | Aug. 22, 1916 |
| 1,383,345 | Sheehan | July 5, 1921 |
| 2,101,815 | Mallory | Dec. 7, 1937 |
| 2,514,760 | Hanson | July 11, 1950 |